United States Patent [19]

Brucat

[11] 4,053,214
[45] Oct. 11, 1977

[54] ADVANCE MECHANISM

[75] Inventor: John N. Brucat, Floral Park, N.Y.

[73] Assignee: Instructional Communications Technology, Inc., Lloyd Harbor, N.Y.

[21] Appl. No.: 664,145

[22] Filed: Mar. 5, 1976

[51] Int. Cl.$^2$ ............................................. G03B 1/22
[52] U.S. Cl. .................................... 352/191; 226/62; 226/67
[58] Field of Search ............... 352/191, 195, 196, 183, 352/194; 226/62, 67

[56] References Cited
U.S. PATENT DOCUMENTS

| 3,306,697 | 2/1967 | Nemeth | 352/194 |
|---|---|---|---|
| 3,441,186 | 4/1969 | Good | 226/62 |
| 3,756,491 | 9/1973 | Moriyama | 352/194 |

Primary Examiner—Monroe H. Hayes
Attorney, Agent, or Firm—Kane, Dalsimer, Kane, Sullivan & Kurucz

[57] ABSTRACT

An advance mechanism for perforated materials such as film strips. The mechanism advances the material through a path of light and includes a support structure adapted to be aligned with a source of light so that the light passes through a rotating aperture in the support and scans line of print. The structure is provided for directing the perforated material along a pathway into and out of vertical alignment with the aperture. A pawl mechanism including a spring on a support adjacent to the aperture and is in a normally retracted position in alignment with a slot adjacent to the aperture in the support. Drive structure is provided for cooperating with a biasing spring and directing the pawl mechanism through the slot into engagement with a perforation in the material and then along the slot a predetermined distance to advance the material. Thereafter the pawl mechanism is released by the drive structure to permit the spring to return the pawl to the retracted position out of the slot. Further, structure is responsive to release of the pawl mechanism and retraction of the pawl through the slot to return the pawl to the normal retracted position. The movement of the biasing spring along the slot is restricted by stop means including at least one upstanding portion on the spring of an enlarged surface area for engagement with a corresponding surface area on the support. Furthermore, a flexible coupling is mounted on the shaft of the drive motor to uniformly index the rotation in the above mentioned member.

23 Claims, 14 Drawing Figures

ADVANCE MECHANISM

BACKGROUND OF THE INVENTION

There are numerous types of advance mechanisms presently in use to advance perforated materials in a sequential and time controlled manner into and out of a path of light. Of primary importance in the advancement of the perforated materials, such as film strips, is that of providing for dependability and to reliability of repeated intermittent and accurate advancement in respect to a given distance.

In projection reading devices it is important that the film be advanced in synchronization with the presentation of light and in this respect it is also necessary to provide simultaneous stroking of the film for advancement purposes and a scanning of the exposed portion of film for controlled exposure of the material contained thereon.

The advance mechanism should be of low cost containing a minimum number of components and should be versatile in that it can be used with a variety of different types of perforated materials such as film, paper tape, timing charts and the like.

SUMMARY OF THE INVENTION

With the above background in mind, it is one of the primary objectives of the present invention to provide an advance mechanism for use with a variety of types of perforated material such as those disclosed above which is of low cost construction, utilizes a minimum number of components and operates dependably and efficiently in advancing the perforated material. The structure is designed to be adapted for use in simultaneous stroking and advancing of perforated material, such as film, so that the frames are presented in synchronization with light from a light source. The structure provides for simultaneous stroking or advancing of the film or other perforated material and scanning of the material by a moving aperture. It is adapted for use with a rotating member having a helical aperture therein so that rotation of the member provides for a left to right scanning of the exposed frame containing lines of printed material by light from a light source passing through the rotating member. A further objective is to provide that an advance mechanism which is designed to be in a normally retracted position out of the pathway of the film. As part of the advancement sequence, the mechanism is brought into contact with the perforation in the film and then advances the film a predetermined distance and then is automatically permitted to return to the normal retracted position. Limit means are provided on the advance mechanism to prevent the stroke from exceeding a predetermined travel distance. The limit means includes an enlarged surface to surface engagement to spread the stopping forces over a wider area thereby increasing the longevity of the mechanism and alleviating the danger of deleterious effects that may occur from surface to surface contact. Additionally, an antislippage flexible coupling is provided in direct contact with the shaft of the drive motor for the advance mechanism and the helical rotating member so that upon advancement of the perforated material the rotating member will be advanced in a uniform and consistant manner. Furthermore, a drag spring is provided on the advance mechanism to assist in retaining the film in position between strokes and to assist in directing the film into engagement with the advance mechanism for driving purposes. In general the drag spring is useful in preventing undesirable movement of the film under a variety of circumstances.

In summary, a film mechanism is provided for use with perforated materials for advancing the material through a path of light. The advance mechanism includes a support structure adapted to be aligned with a source of light so that the light passes through an aperture in the support. An advance means is provided for directing the perforated material along a pathway into and out of vertical alignment with the aperture. A pawl mechanism including spring means is on the support adjacent to the aperture and is normally positioned in a normally retracted position in alignment with a slot adjacent the aperture in the support. Drive means is provided for cooperating with the film advance means and for biasing the spring and directing the pawl mechanism through the slot into engagement with a perforation in the material and than along the slot a predetermined distance to advance the material. Thereafter, the pawl mechanism is released permitting the spring to return the pawl to the retracted position out of the slot. Finally, return means responsive to the release of the pawl mechanism and retraction of the pawl through the slot is provided to return the pawl to the normal retracted position. The structure is provided with limit means to limit the stroke of the spring in respect to the slot and includes enlarged surface engagement between the spring and the support to distribute the forces applied in stopping movement of the spring.

With the above objectives among others in mind, reference is made to the attached drawings.

DESCRIPTION OF THE PREFERRED EMBODIMENTS

Figure 1:
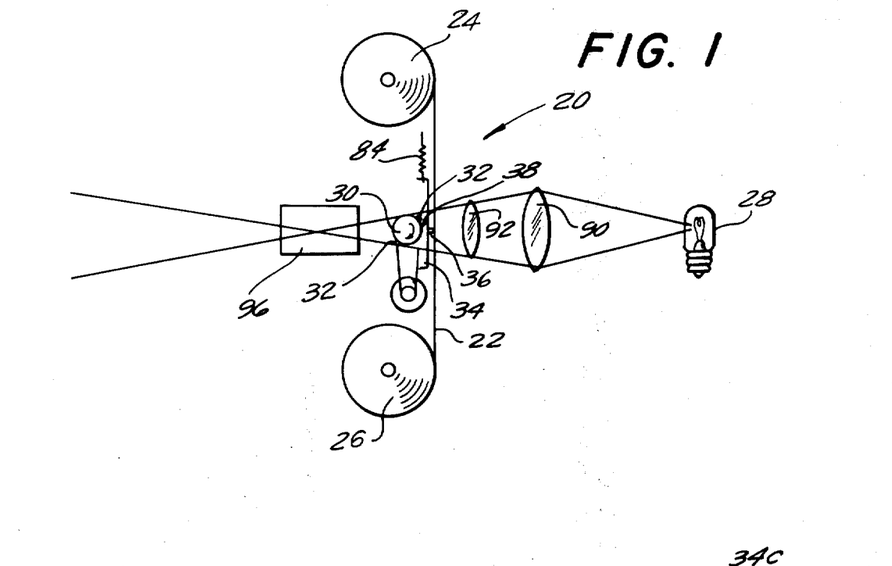
FIG. 1 is a schematic view of the advance mechanism shown in alignment with the light source.

Advance mechanism 20 is shown in schematic form in FIG. 1 as it would be positioned with respect to a strip of perforated material 22 extending from one zeal 24 to a second reel 26. The advance mechanism 20 is mounted on a support structure with an appropriate aperture for passage of light therethrough. The aperture is aligned with a light source 28 from which light can be directed by appropriate condenser lenses 90 and 92 through the portion of the perforated material in alignment with the aperture in the support structure. The image is then projected from a projector lens 96 on to a projection screen for viewing purposes. A rotating cylinder 30 having a pair of opposed projection cams 32 extending therefrom is provided in adjacent position to an elongated leaf spring 34. A pawl 36 for engaging the perforated material extends from one side of leaf spring 34 and an angularly extending drive projection 38 extends from the opposing side of spring 34. A helical return spring 84 is provided to return the leaf spring 34 to its initial position after stroking of the film. In operation, rotation of the rotary cylinder 30 in the direction designated by the arrow in FIG. 1 causes cam 32 to contact angular projection 38 on leaf spring 34 and initially deflect the spring downward and direct the pawl 36 into engagement with a perforation in the perforated material. The cam 32 than drives projection 38 and the remainder of spring 34 with the captured perforated material forward in the direction of motion of rotary member 30 until cam 32 becomes disengaged with projection 38. At that point, the resiliency of leaf spring member 34 will permit it to return to its initial configuration withdrawing pawl 36 from the hole in the perforated material. Thereafter return spring 84 will compress to the relaxed position drawing pawl and spring member 34 back to the initial position. Appropriate limit means are provided on both ends of the spring 34 to restrict movement thereof in the longitudinal direction. In this manner, the perforated material is advanced a predetermined distance. Further advancement is accomplished in the same fashion.

Figures 2, 9, 10, 11, 12:
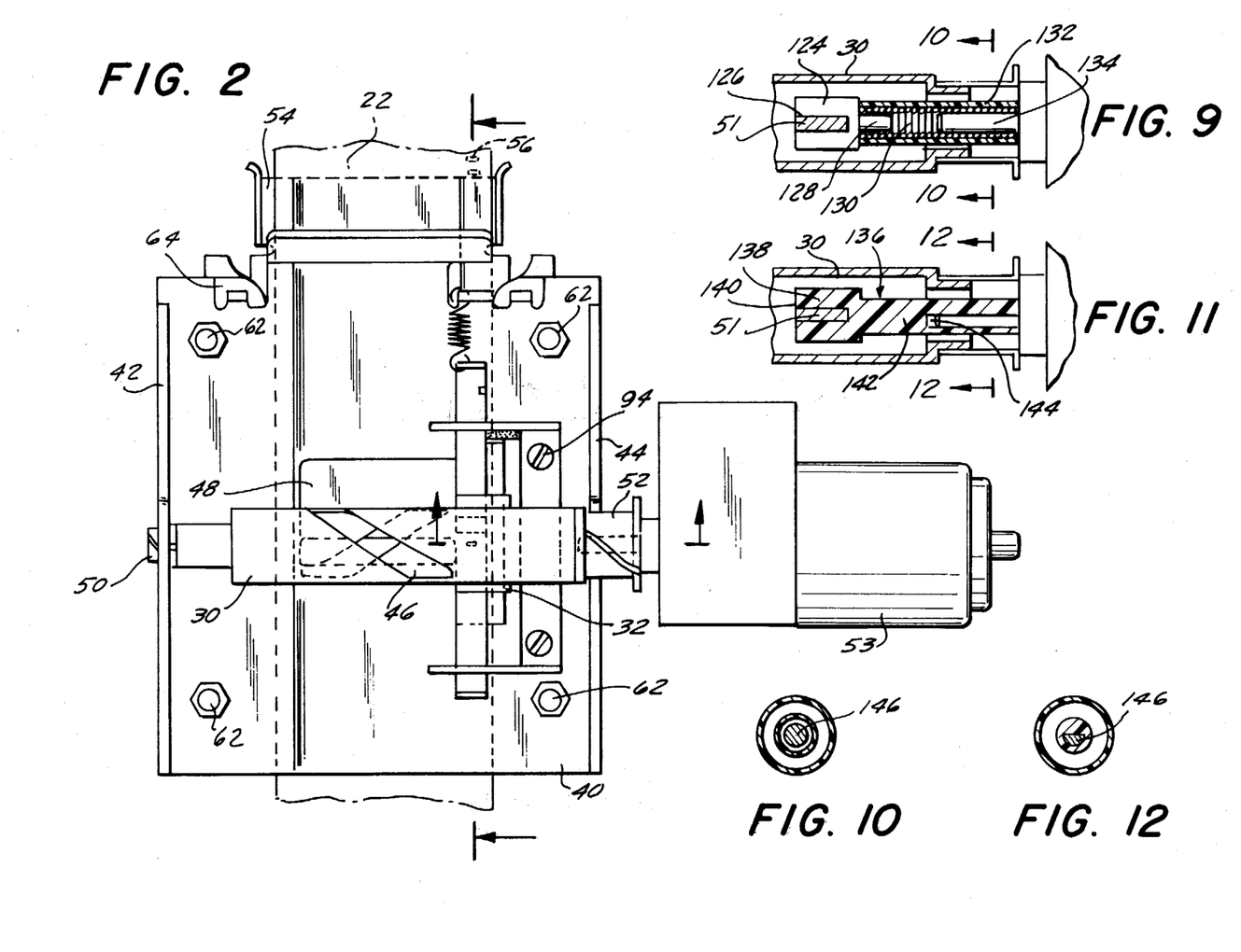
FIG. 2 is a front plan view of the advance mechanism of the invention shown connected to a drive motor and having a strip of perforated film passing therethrough.
FIG. 9 is a fragmentary enlarged sectional view of the connection between the drive motor and the advance mechanism.
FIG. 10 is a sectional view thereof taken along the plane of line 10—10 of FIG. 9.
FIG. 11 is a fragmentary enlarged view of an alternative coupling between the drive motor and the advance mechanism.
FIG. 12 is a sectional end view thereof taken along the plane of line 12—12 of FIG. 11.
Figures 3, 13, 14:
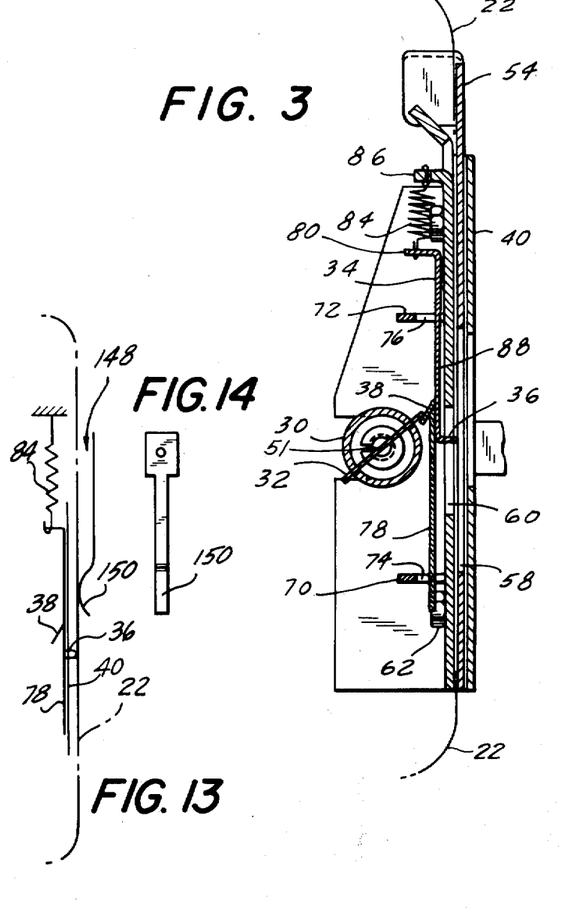
FIG. 3 is a side sectional view thereof taken along the plane of line 3—3 of FIG. 2.
FIG. 13 is a sectional end view of the advance mechanism of the invention showing a drag spring employed therewith.
FIG. 14 is a plan view of the drag spring of FIG. 13.
Figure 4:
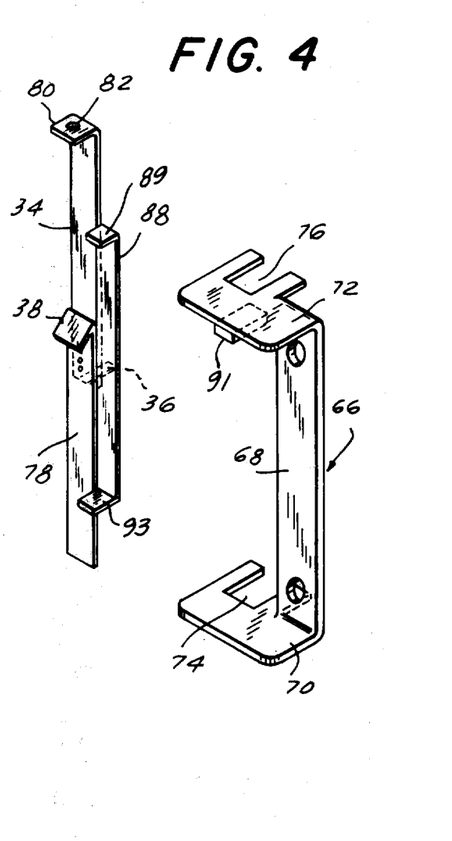
FIG. 4 is a perspective view of several components of the advance mechanism.

FIGS. 2-4 show one embodiment of the advance mechanism as part of a structure employed in the film advance mechanism for advancing a strip of film upon demand. The device is adapted for use in connection with well known projection systems. In FIG. 2, the support structure is in the form of a sheet metal rectangular base 40 having a pair of side walls 42 and 44 with a rotary member 30 in cylindrical form mounted on a pair of opposed openings in the side walls 42 and 44 so as to permit rotation of the rotary member 30. The rotary member has a pair of opposed helical openings 46 which are designed to cooperate with a light source in blocking and permitting passage of light to a central aperture 48 in the support base 40 so as to advance the light beam from left to right across aperture 48. Cylindrical member 30 has one smaller end 50 mounted in a receiving opening in wall 42 and has its larger opposite end 52 positioned in an appropriate receiving slot in the other side wall 44. Intermediate the ends of circular member 30 are a pair of opposed laterally extending cams 32 which are designed to drive the pawl mechanism for advancing the film. These cams 32 extend from the exterior surface of member 30 and a cross bar 51 is the inside extension of cams 32 diametrically across the interior of cylindrical member 30 for engagement with the coupling for the drive motor assembly 53 in a manner described in detail below.

The support structure has a guideway formed by a slideble bottom plate 54 coupled with the underside of the base 40 at a location containing a recessed central portion so as to form a pathway along base 40 for directing a film strip 22 into and out of alignment with aperture 48 which in turn is aligned with the guideway formed by plate 54 and base 40. The film has a plurality of sprocket holes 56 along one edge which are positioned so as to be brought into alignment with an appropriate slot adjacent to aperture 48 and formed by the combined aligned slots 58 and 60 in the plate 54 and base 40. The components of the support structure are fastened in a conventional manner such as by screws and nuts 62 as shown.

Appropriate spacers 64 are employed to assure proper alignment for the pathway provided by the mated plates for purposes of advancement of the film 22.

The pawl mechanism includes a saddle bracket 66 with an elongated central base portion 68 terminating in a pair of opposed end walls 70 and 72. The end walls are upright in configuration and extend laterally from the base portion 68 and include aligned notches 74 and 76 for receipt therethrough of an elongated leaf spring member 34. The leaf spring member 34 is of resilient material such as spring steel to provide the necessary resilience for operation of the pawl mechanism. One end of the leaf spring member 34 includes an upstanding tab 80 with a notch or opening 82 therein. One end of a helical spring 84 is attached to tab 80 through opening 82 and the other end of spring 84 is attached to an upstanding tab 86 on base 40 which also has a receiving orifice therein. In this manner the longitudinal axis of helical spring 84 is substantially aligned with the longitudinal axis of the leaf spring member 34 as depicted in FIGS. 2 and 3. Extending laterally from leaf spring member 34 is a stop portion 88 which is shorter in length than the remainder of spring 34 and is spaced from both ends thereof. One end of stop portion 88 terminates in an upstanding tab 89 which is positioned for enterengagement with a receiving pad 91 on end wall 72 of the bracket. A large contact area provided between the broad tab 89 and the receiving pad 91 facilitates the production of a positive stopping interengagement and reduces the danger of wear of parts since the stopping force is distributed over a large area.

When elongated member 34 is extended through opening 74 and 76 and the walls of the saddle bracket, the stop portion 88 will engage with end wall 72 as just described to limit axial movement in one direction and the other end of stop portion 88 is provided with an upstanding tab 93 opposed to tab 89 for engagement with the wall 70 to limit axial movement in the other direction. Thus, the axial travel of the pawl mechanism is determined. If desired, a pad similar to pad 91 can be provided on the support to engage with tab 93.

On one side of leaf spring member 78 is a downwardly extending pawl 36 which is designed for interengagement with the sprocket holes 56 in film 22. Since leaf spring member 78 is flexible it can flex to disengage pawl 36 from film perforation 56 to prevent damage to film such as when film is manually pulled, or when the perforation is not vertically aligned to receive the pawl. Somewhat aligned with pawl 36 on the opposite side of spring 34 is an angularly extending upward projection 38 which forms a flexible shoulder for engagement with cams 32 of rotary member 30.

In general, the elongated leaf spring member 34 is positioned in slots 74 and 76 of saddle bracket 66 and saddle bracket 66 is mounted to base 40 at the appropriate point by means of conventional fasteners such as screw and nut assemblies 94. Elongated spring member 34 is than in position to be attached at one end to helical spring 84 which is mounted to tab 86 on the base 40. Limit tabs 89 and 93 are in position for limiting axial movement of spring 34 with respect to the slot and end walls 72 and 70. Pawl 36 is positioned in alignment with slot arrangement 60 and 58 in the support assembly in position to be inserted in a sprocket hole in the row of sprocket holes 56 and film 22.

Rotary member is than positioned inn the appropriate receiving slots in the side walls 42 and 44 which puts cams 32 in alignment for interengagement with upwardly extending drive projection 38. The entire mechanism can than be inserted into an appropriate projector with aperture 48 and the aligned helical openings in the rotary member aligned with the source of light. Drive motor assembly is coupled with the end of rotary member 30 by interconnection between the drive shaft of motor assembly and the cylinder 30. Two different coupling means for interconnection between the shaft of motor assembly 53 and rotary member 30 are depicted as alternative forms of connection within the scope of the present invention. The first form of coupling is depicted in FIGS. 9 and 10 and the second is depicted in FIGS. 11 and 12. Both means of coupling will be discussed in greater detail below and both involve direct couplings which alleviate the danger of slippage between the rotary member and the drive means thereby maintaining positive movement of the film to the desired degree upon demand. In this manner, synchronization is provided between the scanning effect of the helical apertures as achieved by a rotation of the rotary member 30 in alignment with the source of light an appropriate advancement of the frames of the film. In the depicted forms, the result is a controlled scanning of the material on an individual frame and suitable advancement at the appropriate time with the rotary being simultaneously rotated so as to provide continuous scanning of the frames of the film as they are brought into alignment with the aperture and the source of light.

The operation of the advance mechanism is the same as that originally described above in connection with the schematic view of FIG. 1. With the source of light showing through helical openings 46 and through aperture 48 upon the exposed frame of the film, drive means is operated upon demand to rotate rotatable member 30 and cam 32 into engagement with the drive projection 38 on elongated spring member 34, forcing the spring downward and the pawl into a sprocket hole and then advancing the spring and film in the direction of the arrow as shown in the first of four schematic views of FIG. 5 traveling from left to right. Rotation of rotary member 30 causes cam 32 to exert initially a downward force of projection 38 so as to deflect spring 34 and force pawl 36 through aligned apertures 60 and 58 and into register with sprocket opening 56 and film 22. Continued rotation of rotary member 30 and cam 32 causes a forward force to be applied to shoulder 38 thereby sliding spring 34 forward. This action advances pawl 36 and interengaged film 22 forward until the cam becomes disengaged with projection shoulder 38 because further forward motion of spring 34 is prohibited by engagement between the end of limit tab 88, as formed by upstanding tab 93, on the inner surface of wall 70 of the saddle bracket. The cam 32 than eventually passes beyond shoulder 38 out of engagement therewith thereby permitting the spring to return to the relaxed position with pawl 36 withdrawing from the sprocket hole in film 22 and back through aligned apertures 60 and 58. This action is depicted in the second from the left schematic representation of FIG. 5.

Thereafter, as rotary member 30 continues to rotate independent of spring 34, return spring 84 which forms the return means withdraws back toward its relaxed position thereby axially returning spring 34 to its normal and initial retracted position. This action is depicted in the third from left schematic representation of FIG. 5. It should be noted that the forward movement of spring 34 as caused by cam 32 causes a biasing of spring 84 and the ultimate release of the shoulder will permit spring 84 to return to its initial position thereby drawing spring 34 back to the initial retracted position. The pawl mechanism and spring are than ready to receive a further force exerted by cam 32 to repeat the advancement of the film again to the predetermined amount bringing a further frame of film into alignment with aperture 48. The return action of spring 84 will withdraw spring 34 until upstanding tab 88 engages with pad 91 on the rear wall 72. An appropriate pad can also be provided on the inner surface of wall 70 for engagement with upstanding tab 93. The travel distance of the spring and accordingly pawl 36 and film 22 on any individual stroke is controlled by the difference between the length of limit tab 88 and the distance between end walls 70 and 72 minus the thickness of pads. Accordingly, there is no variation in travel distance and there is no danger of over or under advancement of the film on each particular stroke. This is advantageous when one desires simultaneous stroking of the film and scanning of the subject matter on each individual frame by means of the helical openings 46 and the rotating member 30.

Figure 5:
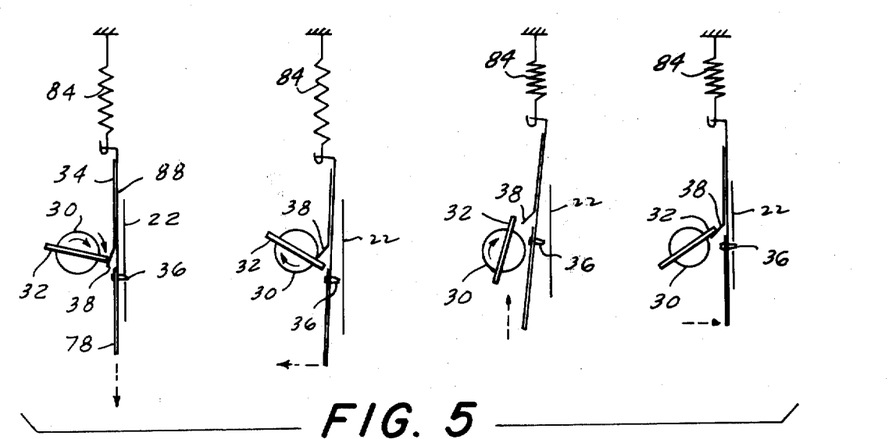
FIG. 5 is a four step schematic view of the path of travel of the advance mechanism in advancing a strip of perforated material.

As shown in the fourth from left representation of FIG. 5, the advancement process is repeated by continued rotation of rotary member 30 which will once again bring a cam 32 into engagement with projection 38 on spring 34.

There are a number of different types of materials that can be used for spring 34 depending upon factors such as the desired resilience and formability of the spring member. In the initially depicted embodiment discussed above, a rather rigid spring element is employed with little or negligible deformation of the straight spring occuring during the sequence of operations. Alternatively, the spring can be constructed of a more flexible material whereby the shifting of the pawl through the slot would resiliently deform the spring into a bulb-shaped configuration. This can be accomplished by the natural resilience of the spring material or by retaining both ends of the spring in relatively fixed position whereby the central portion is resiliently bowed to pass the pawl through the slot. Naturally upon release the spring would return to its initial configuration with the pawl being drawn back through the slot. Several other constructions for spring 34 are depicted in FIGS. 6–8 of the drawings.

Figure 6:
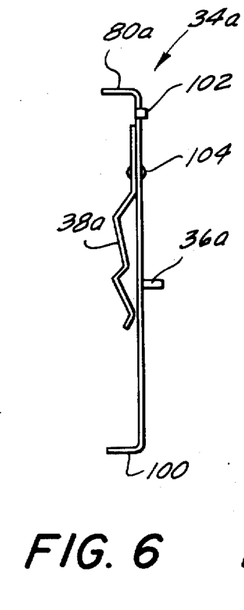
FIG. 6 is a plan view of an alternative form of spring for use with the advance mechanism of the invention.

In FIG. 6, spring 34a is an elongated member having an upstanding tab 80a for connection to a helical return spring and has a corresponding upstanding tab 100 at the other end which is designed to meet with the outer surface of wall 70 to form a stop for movement of the spring axially in one direction. The limit of movement in the other direction is controlled by a downwardly extending tab 102 which is in position for engagement with the rear surface of wall 72. Pawl 36a operates in the same manner as in the previous embodiment as does angularly extending shoulder 38a which has a slightly different configuration from the previous embodiment. It is corrugated so as to form a central depression between two hills which facilitate the positive engagement between the rotating cylinder and the spring 34a. The corrugated shoulder 38a is fastened to the remainder of the spring in a convention fashion such as by rivet 104. Spring 34a operates in a similar manner as the previous embodiment in advancing a strip of film. However the difference is in the limit means whereby the travel distance is controlled by the spacing between tabs 102 and 100 and corresponding walls 70 and 72.

Figure 7:
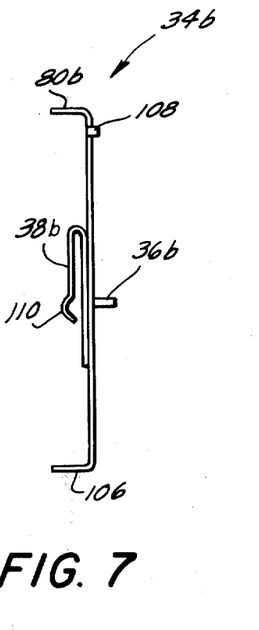
FIG. 7 is a plan view of a second alternative form of spring.

Spring 34b as depicted in FIG. 7 is quite similar to spring embodiment 34a. It includes an upstanding tab 80b for connection to the helical return spring and an opposing tab 106 at the other end which cooperates with downwardly extending tab 108 in providing engaging limit means with wall 70 and 72 respectively. Pawl 36b operates in the same manner as does shoulder 38b. However shoulder 38b is formed somewhat differently in that it is a U-shaped member riveted or fastened in another conventional way to the upper surface of the base of spring 34b. The remaining leg of the U-shaped member is free at the end and terminates in an arcuate flange 110. The resilience of the U-shaped member permits its appropriate movement in engaging with cylinder 30 as with the previous embodiments and the flange 110 forms the surface over which the cam surfaces pass in engagement and disengagement with the spring.

Figure 8:
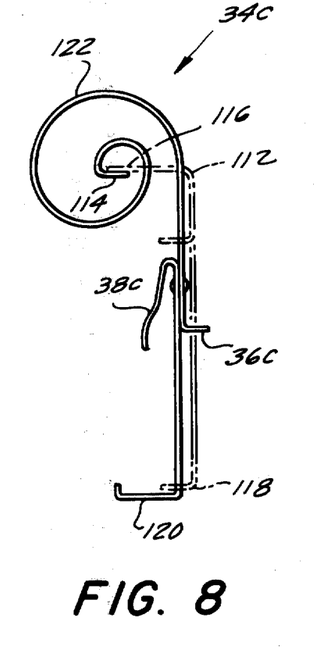
FIG. 8 is a plan view of a third alternative form of spring.

The final depicted embodiment for the spring is spring 34c of FIG. 8. This embodiment combines in a unitary manner the return spring with the elongated film advance spring. Spring 34c is a unitary member of resilient spring material mounted to a saddle 112. One end 114 of the spring is mounted in a conventional fashion such as by a screw to an upstanding wall 116 on the saddle. The spring is than coiled and extended through a series of aligned apertures in saddle 112 with the final aperture being in the remote end wall 118. After the spring passes through that end wall is bent upward into form an upwardly extending tab 120 so that the spring is captured within saddle 112 from end to end. However the spring is permitted axial movement due to the resilience of the coiled portion 122. Accordingly it is free to slide axially the desired distance for operation in the similar manner as in the previous embodiments. The resilience of coil 122 forms the return means and the limit means is defined by engagement between the inner surface of tab 120 and the outer surface of end wall 118 in one direction and engagement between the pawl 36c and surfaces on the saddle 112 in the other direction. An appropriate arcuate shoulder 38c is provided to operate in the same manner as the previous shoulders for engagement with cylinder 30 and advancement of the film.

FIGS. 9 and 10 and FIGS. 11 and 12 respectively show two different means of coupling the drive shaft of the drive motor assembly 53 with the cylindrical member 30 of the advance mechanism. The object of both designs is to couple the members together so as to prevent slippage as the motor drives an intermittent film advance load. The first embodiment of FIGS. 9 and 10 includes a coupling with one end being in the form of an enlarged tubular base 124 with a slot 126 in one end to receive the cross arm 51 within cylinder 30 therein. A reduced diameter portion 128 extends rearwardly from base 124 and has mounted thereon a coiled spring 130 surrounded by a cover 132. The combined spring and cover extended beyond reduced portion 128 and terminate in an open end to receive the end portion 134 of the drive shaft of motor assembly 53. The spring and covering arrangement fits tightly on shaft 134 and on base reduced portion 128 so as to retain the elements in relatively fixed rotational position. In turn the cylinder 30 is also held in relatively fixed rotational position with respect to the drive shaft of the motor through the interconnecting with cross arm 51. Thus, slippage is minimized and rotational movement of the motor will correspondently move the cylinder 30 the same distance and the tight gripping effect of the coupling will also prevent slippage of member 30 with respect to the drive shaft. In this manner accuracy of the assembly is achieved. Materials for the coupling are of a conventional nature and it has been found that a steel material for base 124 and for coil spring 130 is acceptable. A shrunk fit plastic can be used for cover 122 to assist in retaining the spring in relatively tight engagement with the members on which it is mounted.

An alternative form of coupling is depicted in FIGS. 11 and 12 and includes a unitary member 136 having a somewhat similar configuration to the embodiment of FIGS. 9 and 10 An enlarged end portion 138 is provided with a slot 140 for engagement with cross arm 51 of cylinder 30. The remaining portion 142 of coupling 136 is of reduced diameter and has an opening extending from the end opposite to the enlarged portion. The opening 144 has a D-shaped configuration to correspond to a D-shaped end portion 146 of the drive shaft of motor assembly 53. This D-shaped interengagement between portion 146 and opening 144 prevents relative rotation of the coupling 136 with respect to the drive shaft and, accordingly, prevents relative rotation of the cylinder with respect to the drive shaft. Thus slippage is prevented and positive exact movement is achieved. A common type of plastic material such as polypropylene has been found to be effective for coupling 136 and it can be molded in a one piece configuration.

FIGS. 13 and 14 depict a further embodiment which includes a drag spring 148 mounted to the support 40 at one end and having a free end in the form of an arcuate flange 150. The spring is positioned so that flange 150 is in alignment with the slot providing access to spring 34. The flange 150 of drag spring 148 is positioned inside slot 58 and is biased on the inner surface of base structure 40. The film 22 is pressed by flange 150 against base 40. Naturally spring 34 is driven downward during operation in advancing the film strip, in a similar manner as in the previous embodiments. The drag spring 148 is mounted at its fixed end in a conventional manner such as by a rivet or a screw and nut assembly. It operates to keep the film from moving between advance strokes since it engages the underside of the film and forces it upward against the support. This occurs since the film is located between spring 148 and the slotted support. In the same manner, it also serves to position and guide the perforated edge of the film toward the pawl 36 and achieve a more positive interengagement therewith. This eliminates the possibility of a thin film floating within a larger lateral area of free movement and possible failure of the pawl to mate with a sprocket hole. The drag spring also serves to keep the film from moving during other stages of operation once again because of its biasing the film upward against the slotted support.

It should be kept in mind that the arrangement of upstanding tabs and cushion limit structure on the above discussed embodiments provide a more positive seating effect as well as distributing the force and also provides a silent interengagement since there is no metal to metal contact at either end. The pads can be formed of rubber or other well known substitute therefor.

Thus, the several aforenoted objects and advantages are most effectively attained. Although several somewhat preferred embodiments have been disclosed and described in this invention is in no sense limited thereby and its scope is to be determined by that of the appended claims.

I claim:

1. An advance mechanism for perforated materials for advancing the material though a path of light comprising:

a support structure adapted to be in line with a source of light so that light passes through an aperture in the support;

material support and advance means for directing the perforated material along the pathway into and out of alignment with the aperture;

a pawl mechanism including spring means on the support adjacent the aperture and normally positioned in a normal retracted position in alignment with a slot adjacent to the aperture in the support;

drive means for cooperating with the material advance means and for biasing the spring and directing the pawl mechanism through the slot into engagement with a perforation in the material and then along the slot a predetermined distance to advance the material and then releasing the pawl mechanism permitting this spring to return the pawl to the retracted position out of the slot;

return means responsive to release of the pawl mechanism and retraction of the pawl through the slot to return the pawl to normal retracted position;

limit means positioned on the support and on the pawl mechanism to restrict the distance of movement of the pawl mechanism along the length of the slot;

the limit means including at least one enlarged receiving surface on the support and a corresponding enlarged bearing surface on the pawl mechanism whereby movement of the pawl mechanism along the slot a predetermined distance will bring the enlarged bearing surface into engagement and stop further movement of the advance mechanism with respect to the slot and with the engagement between the enlarged surfaces distributing the force applied in limiting the movement of the pawl mechanism;

the pawl mechanism including an elongated leaf spring mounted on the support and having a downwardly extending pawl intermediate its ends in alignment with and in position for extension through the slot in the support;

a drive projection extending from the side of the elongated leaf spring opposite to the pawl and in position for engagement by a portion of the drive means;

the elongated leaf spring being slidably positioned on the support so that engagement of the drive means with the drive projection and application of a force thereto will bias the leaf spring until the pawl extends through the slot into engagement with a perforation in the perforated material and then the leaf spring will be slidably moved by the drive means and the perforated material accordingly advanced, and when the drive means is disengaged from the leaf spring, the leaf spring will return to its initial configuration with the pawl disengaged from the perforated material and withdrawn through the slot in the support whereupon the return means can return the leaf spring to the normal retracted position; and the drive projection being resilient and capable of acting as a spring independent of the remainder of the leaf spring to facilitate continued movement of the drive means after the movement of the advance mechanism has been stopped to permit disengagement therebetween and to cooperate in permitting the leaf spring to flex and disengage the pawl from the perforated material thereby preventing damage to the perforated material when the perforated material is manually pulled or when a perforation is not properly aligned with the pawl.

2. The invention in accordance with claim 1 wherein the limit means on the support includes a pair of spaced end walls on the support and with an aperture in each end wall aligned with the elongated leaf spring member to permit the passage therethrough as the leaf spring member is slid with respect to the slot, a lateral stop extending from the elongated member between the end walls with the stop being shorter than the distance between the end walls so that the elongated member is permitted to slide the distance equal to the difference in the length of the stop and the distance between the end walls, at least one end of the lateral stop terminating in an upstanding tab forming an enlarged bearing surface which is substantially parallel to the adjacent end wall so that when it engages therewith the force therebetween will be distributed over an enlarged area.

3. The invention in accordance with claim 2 wherein the drive projection on the elongated members is an upwardly extending prong which extends in the direction of movement of the elongated member when subjected to a force from the drive means.

4. The invention in accordance with claim 2 wherein the return means is a helical spring attached to one end of the elongated leaf spring member and at the other end to the support, the helical spring being relaxed when the leaf spring is in the normal position with the pawl in the normal retracted position whereupon sliding of the elongated member to advance the perforated material biases the helical spring so that when the leaf spring is released the helical spring will return to the normal relaxed position and slide the leaf spring back to the initial position.

5. The invention in accordance with claim 1 wherein the perforated material is a film strip having individual frames containing subject matter to be observed and a row of perforations along one edge thereof to be positioned in alignment with the slot for engagement with the pawl mechanism.

6. The invention in accordance with claim 1 wherein the slot is a narrow elongated aperture positioned adjacent to the larger aperture in the support so that the perforated material can be advanced with the material to be observed in alignment with the larger aperture in the support and perforations aligned with the slot for engagement by the pawl mechanism.

7. The invention in accordance with claim 1 wherein the drive projection is a corrugated member having one free end and fixed in position on the elongated leaf spring, the limit means including a pair of spaced end walls on the support with an aperture in each end wall aligned with the elongated leaf spring member to permit the passage therethrough as the leaf spring member is slid with respect to the slot, an upstanding end stop tab on at least one end of the leaf spring for engagement with the wall to stop movement of the spring in one direction and a downwardly extending tab adjacent the end of the leaf spring distal from the upstanding tab to cooperate with the support in limiting movement of the spring in the opposite direction.

8. The invention in accordance with claim 1 wherein the drive projection is in the form of a U-shaped member fastened at one end to the leaf spring and terminating in the other free end in an annular flange, the limit means including a pair of spaced end walls on the support with an aperture in each end wall aligned with the elongated leaf spring member to permit the passage therethrough as the leaf spring members slid with respect to the slot, an upstanding stop tab on one end of the leaf spring for engagement with the support to limit movement of the spring in one direction and a downwardly extending tab adjacent the other end of the leaf spring to cooperate with the support in limiting movement of the spring in the opposite direction.

9. The invention in accordance with claim 1 wherein the pawl is integrally formed with the leaf spring, the drive projection is a spring like extension intermediate the ends of the leaf spring having a free end for engagement by a portion of the drive means, the limit means including a pair of spaced end walls on the support with an aperture in each end wall aligned with the elongated leaf spring to permit the passage therethrough as the leaf spring member is slid with respect to the slot, an upstanding stop formed on one end of the leaf spring for engagement with the support to limit movement of the leaf spring in one direction and means on the leaf spring and support to limit movement of the leaf spring in the opposite direction, the return means being in the form of a spring loop formed in the elongated spring member mounted on the support so that the loop tends to expand and move the spring in the return direction.

10. An advance mechanism for perforated materials for advancing the material through a path of light comprising:
   a support structure adapted to be in line with a source of light so that light passes through an aperture in the support;
   material support and advance means for directing the perforated material along the pathway into and out of alignment with the aperture;
   a pawl mechanism including spring means on the support adjacent the aperture and normally positioned in normal retracted position in alignment with a slot adjacent to the aperture in the support;
   drive means for cooperating with the material advance means and for biasing the spring and directing the pawl mechanism through the slot into engagement with a perforation in the material and then along the slot a predetermined distance to advance the material and then releasing the pawl mechanism permitting this spring to return the pawl to the retracted position out of the slot;
   return means responsive to release of the pawl mechanism and retraction of the pawl through the slot to return the pawl to normal retracted position;
   limit means positioned on the support and on the pawl mechanism to restrict the distance of movement of the pawl mechanism along the path of the slot;
   the limit means including at least one enlarged receiving surface on the support and a corresponding enlarged bearing surface on the pawl mechanism whereby movement of the pawl mechanism along the slot a predetermined distance will bring the enlarged bearing surface into engagement and stop further movement of the advance mechanism with respect to the slot and with the engagement between the enlarged surfaces distributing the force applied in limiting the movement of the pawl mechanism;
   the pawl mechanism including an elongated leaf spring mounted on the support and having a downwardly extending pawl intermediate its ends in alignment with and in position for extension through the slot in the support;
   a drive projection extending from the side of the elongated leaf spring opposite to the pawl and in position for engagement by a portion of the drive means;
   the elongated leaf spring being slideably positioned on the support so that engagement of the drive means with the drive projection and application of a force thereto will bias the leaf spring until the pawl extends through the slot into engagement with a perforation in the perforated material and then the leaf spring will be slideably moved by the drive means and the perforated material accordingly advanced, and when the drive means is disengaged from the leaf spring, the leaf spring will return to its initial configuration with the pawl disengaged from the perforated material and withdrawn through the slot in the support whereupon the return means can return the leaf spring to the normal retracted position;
   the drive means including a cylinder rotatably mounted on the support and adapted to be connected to a drive source;
   the cylinder including at least one helical aperture therein in alignment with the aperture in the support and in position for location between a light source and the aperture;
   at least one drive cam extending from the outer cylindrical surface of the cylindrical member and in alignment with the drive projection on the surface of the leaf spring, whereupon the actuation of the drive means to rotate the cylindrical member will bring the cam into engagement with the drive projection and initially deflect the leaf spring member downward to engage with the perforated material and than continued rotation of the cylindrical member will slide the leaf spring with respect to the slot thereby advancing the perforated member until continued rotation of the cylindrical member brings the drive cam out of engagement with the leaf spring member.

11. The invention in accordance with claim 10 wherein the position of the helical apertures are arranged with respect to the projecting cams on the circular member so that as the cam drives the leaf spring and advances the perforated member, the helical opening will permit passage of light through the tubular member and through the aperture in the support so that the material on the advanced perforated material will be scanned from left to right by light from the light source in a simultaneous manner.

12. The invention in accordance with claim 10 wherein the drive means includes the cylinder being hollow and having a cross bar on the interior surface thereof intermediate the ends, the cross bar adapted to receive one end of a coupling and the other end of the coupling adapted to be connected to the drive shaft of a motor and to prevent relative rotation of the cylinder with respect to the shaft of the motor and thereby prevent slippage between the cylinder and the drive shaft of the motor.

13. The invention in accordance with claim 10 wherein a drag spring is on the support in alignment with the perforated material and to bias the perforated material against the support structure and in alignment with the pawl mechanism.

14. The invention in accordance with claim 10 wherein the coupling is a member of material of limited flexability with surfaces at one end for engagement with the cylinder to prevent relative rotation therebetween and at the other end for engagement with a motor shaft to prevent relative rotation therebetween so as to couple the cylinder with the motor shaft and, prevent relative rotation between the cylinder, the coupling and the motor shaft while permitting compensation for misalignment.

15. The invention in accordance with claim 14 wherein the drive means includes the cylinder being hollow and having a cross bar on the interior surface thereof intermediate the ends, the cross bar adapted to receive one end of the coupling nd the other end of the coupling adapted to be connected to the drive shaft of a motor and to prevent relative rotation of the cylindr with respect to the shaft of the motor and thereby prevent slippage between the cylinder and the drive shaft of the motor, the coupling being a molded member of material of limited flexability with a slot at one end for engagement with the cross arm in the cylinder and having a D-shaped opening in the other end for reception of a D-shaped extension of the motor shaft therein thereby to prevent relative rotation therebetween while permitting compensation for misalignment, the coupling being of polypropylene material.

16. An advance mechanism for perforated materials for advancing the material through a path of light comprising:
   a support structure adapted to be in line with a source of light so that light passes through an aperture in the support;
   material support and advance means for directing the perforated material along the pathway into and out of alignment with the aperture;
   a pawl mechanism including spring means on the support adjacent the aperture and normally positioned in normal retracted position in alignment with a slot adjacent to the aperture in the support;
   drive means for cooperating with the material advance means and for biasing the spring and directing the pawl mechanism through the slot into engagement with a perforation in the material and then along the slot a predetermined distance to advance the material and then releasing the pawl mechanism permitting this spring to return the pawl to the retracted position out of the slot;
   return means responsive to release of the pawl mechanism and retraction of the pawl through the slot to return the pawl to normal retracted position;
   limit means positioned on the support and on the pawl mechanism to restrict the distance of movement of the pawl mechanism along the length of the slot;
   the limit means including at least one enlarged receiving surface on the support and a corresponding enlarged bearing surface on the pawl mechanism whereby movement of the pawl mechanism along the slot a predetermined distance will bring the enlarged bearing surfaces into engagement and stop further movement of the advance mechanism with respect to the slot and with the engagement between the enlarged surfaces distributing the force applied in limiting the movement of the pawl mechanism;
   the pawl mechanism including an elongated leaf spring mounted on the support and having a downwardly extending pawl intermediate its ends in alignment with and in position for extension through the slot in the support;
   a drive projection extending from the side of the elongated leaf spring opposite to the pawl and in position for engagement by a portion of the drive means;
   the elongated leaf spring being slideably positioned on the support so that engagement of the drive means with the drive projection and application of a force thereto will bias the leaf spring until the pawl extends through the slot into engagement with a perforation in the perforated material and then the leaf spring will be slideably moved by the drive means and the perforated material accordingly advanced, and when the drive means is disengaged from the leaf spring, the leaf spring will return to its initial configuration with the pawl disengaged from the perforated material and withdrawn through the slot in the support whereupon the return means can return the leaf spring to the normal retracted position;
   the drive means including a cylinder rotatably mounted on the support and adapted to be connected to a drive source;
   the cylinder including at least one helical aperture therein in alignment with the aperture in the support and in position for location between a light source and the aperture;
   at least one drive cam extending from the outer cylindrical surface of the cylindrical member and in alignment with the drive projection on the surface of the leaf spring, whereupon the actuation of the drive means to rotate the cylindrical member will bring the cam into engagement with the drive projection and initially deflect the leaf spring member downward to engage with the perforated material and than continued rotation of the cylindrical member will slide the leaf spring with respect to the slot thereby advancing the perforated member until continued rotation of the cylindrical member brings the drive cam out of engagement with the leaf spring member;
   the drive means including the cylinder being hollow and having a cross bar on the interior surface thereof intermediate the ends;
   the cross bar adapted to receive one end of a coupling and the other end of the coupling adapted to be connected to the drive shaft of a motor and to prevent relative rotation of the cylinder with respect to the shaft of the motor and thereby prevent slippage between the cylinder and the drive shaft of the motor;

the coupling including an end plug having a slot at one end for interengagement with the cross arm in the cylinder and having a cylindrical prong of smaller diameter extending from the other end;

a helical spring having one end mounted on the prong;

a cover tube over the helical spring and the other end over the helical spring adapted to receive the end of a shaft of the motor therein and engage therewith so as to restrict relative rotation between the shaft of the motor and the cylinder.

17. The invention in accordance with claim 16 wherein the coupling is formed with a base and spring of steel and the cover tube is of plastic material shrunk fit on the spring.

18. An advance mechanism for perforated materials for advancing the material through a path of light comprising:

a support structure adapted to be in line with a source of light so that light passes through an aperture in the support;

material support and advance means for directing the perforated material along the pathway into and out of alignment with the aperture;

a pawl mechanism including spring means on the support adjacent to the aperture and normally positioned in a normally retracted position in alignment with a slot adjacent to the aperture in the support;

drive means for cooperating with the material advance means and for biasing the spring and directing the pawl mechanism through the slot into engagement with a perforation in the material and then along the slot a predetermined distance to advance the material and then releasing the pawl mechanism permitting this spring to return the pawl to the retracted position out of the slot;

return means responsive to release of the pawl mechanism and retraction of the pawl through the slot to return the pawl to a normally retracted position;

limit means positioned on the support and on the pawl mechanism to restrict the distance of movement of the pawl mechanism along the length of the slot;

the drive means including a rotatable drive cylinder on the support and having means thereon to receive one end of a coupling and the other end of the coupling adapted to be connected directly to the drive shaft of a motor and to prevent relative rotation of the cylinder with respect to the shaft of the motor and thereby prevent slippage between the cylinder and the drive shaft of the motor;

the coupling including an end plug having a slot at one end for interengagement with a corresponding surface in the cylinder and having a cylindrical prong of a smaller diameter extending from the other end;

a helical spring having one end mounted on the prong;

a cover tube over the helical spring and the other end over the helical spring adapted to receive the end of the shaft of the motor therein and engage therewith so as to restrict relative rotation between the shaft of the motor and the cylinder.

19. The invention in accordance with claim 18 wherein the coupling is formed with a base and spring of steel and the cover tube is of plastic material shrunk fit on the spring.

20. An advance mechanism for perforated materials for advancing the material through a path of light comprising:

a support structure adapted to be in line with a source of light so that light passes through an aperture in the support;

material support and advance means for directing the perforated material along the pathway into and out of alignment with the aperture;

a pawl mechanism including spring means on the support adjacent the aperture and normally positioned in a normal retracted position in alignment with a slot adjacent to the aperture in the support;

drive means for cooperating with the material advance means and for biasing the spring and directing the pawl mechanism through the slot into engagement with a perforation in the material and then along the slot a predetermined distance to advance the material and then releasing the pawl mechanism permitting this spring to return the pawl to the retracted position out of the slot;

return means responsive to release of the pawl mechanism and retraction of the pawl through the slot to return the pawl to normal retracted position;

limit means positioned on the support and on the pawl mechanism to restrict the distance of movement of the pawl mechanism along the length of the slot;

the drive means including a rotatable drive cylinder on the support and having means thereon to receive one end of a coupling and the other end of the coupling adapted to be connected directly to the drive shaft of a motor and to prevent relative rotation of the cylinder with respect to the shaft of the motor and thereby prevent slippage between the cylinder and the drive shaft of the motor; and the coupling being a member of material of limited flexability with surfaces at one end for engagement with the cylinder to prevent relative rotation therebetween and at the other end for engagement with a motor shaft to prevent relative rotation therebetween so as to couple the cylinder with the motor shaft and prevent relative rotation between the cylinder, the coupling and the motor shaft while permitting compensation for misalignment.

21. The invention in accordance with claim 20 wherein the drive cylinder includes at least one helical aperture therein, in alignment with the aperture in the support and in position for location between a light source and the aperture at least one drive cam extending from the outer cylindrical surface of the cylindrical member and in alignment with the spring means, whereupon actuation of the drive means to rotate the cylindrical member will bring the drive cam into engagement with the spring producing engagement between the pawl mechanism and a perforation on the material and then continued rotation of the cylindrical member will slide the spring with respect to the slot thereby advancing the perforated material until continued rotation of the cylindrical member brings the drive cam out of engagement with the spring.

22. The invention in accordance with claim 20 wherein the drive means includes the cylinder being hollow and having a cross bar on the interior surface thereof intermediate the ends, the cross bar adapted to receive one end of the coupling and the other end of the coupling adapted to be connected to the drive shaft of a motor and to prevent relative rotation of the cylinder with respect to the shaft of the motor and thereby prevent slippage between the cylinder and the drive shaft of the motor, the coupling being a molded member of material of limited flexability with a slot at one end for engagement with the cross arm in the cylinder and having a D-shaped opening in the other end for reception of a D-shaped extension of the motor shaft therein thereby to prevent relative rotation therebetween while permitting compensation for misalignment, the coupling being of polypropylene materials.

23. The invention in accordance with claim 20 wherein a drag spring is on the support in alignment with the perforated material and to bias the perforated material against the support structure in alignment with the pawl mechanism.

* * * * *